United States Patent [19]

Takahashi

[11] Patent Number: 5,449,217
[45] Date of Patent: Sep. 12, 1995

[54] WEATHER STRIP

[75] Inventor: Eiichi Takahashi, Inazawa, Japan

[73] Assignee: Toyota Gosei Co., Ltd., Nishikasugai, Japan

[21] Appl. No.: 213,804

[22] Filed: Mar. 16, 1994

[30] Foreign Application Priority Data

Apr. 19, 1993 [JP] Japan .............. 5-019959 U

[51] Int. Cl.6 .............. B60J 10/02; E06B 7/14
[52] U.S. Cl. .............. 296/146.15; 296/154; 49/476.1
[58] Field of Search .............. 296/146.15, 146.16, 296/154, 201; 49/476.1

[56] References Cited

U.S. PATENT DOCUMENTS 3,927,493 12/1975 Tsuneishi et al. .............. 49/476.1
4,669,241 6/1987 Kelly .
5,078,444 1/1992 Shirahata et al. .............. 296/201 X

FOREIGN PATENT DOCUMENTS 2481354 10/1981 France .............. 49/476.1
5-9215 3/1993 Japan .
2138479 10/1984 United Kingdom .............. 296/146.15
2140067 11/1984 United Kingdom .............. 296/146.15

Primary Examiner—Dean Kramer
Attorney, Agent, or Firm—Cushman, Darby & Cushman

[57] ABSTRACT

A weather strip for a back window of a truck or the like has an interior hold portion that holds a flange of a window frame, and a tongue sealing portion that covers the outside face of the back panel. The tongue sealing portion has at least one lip portion, which presses against the back panel. The weather strip also includes a blind lip having a tip that is disposed at substantially the same height level as an exterior of the window frame. Furthermore, a drain hole that continues from a base portion of the blind lip to the backside of the tongue sealing portions is provided to drain water, which drips from the window frame.

6 Claims, 2 Drawing Sheets

WEATHER STRIP

BACKGROUND OF THE INVENTION

Japanese Utility Model Application No. Hei 5-19959 filed on Apr. 19, 1993, upon which priority is based, is hereby incorporated herein by reference.

1. Field of the Invention

The present invention relates to a weather strip. More particularly, the present invention relates to a weather strip that holds a window frame for a slide window in a back window of a truck or the like.

2. Description of Related Art

Conventional weather strips that hold window frames for slide windows in a back window are described in examined Japanese Utility Model Application No. Hei 5-9215 and U.S. Pat. No. 4,669,241.

FIG. 2 illustrates such a conventional weather strip for back windows taken along line 2—2 FIG. 1, which depicts a cab type truck.

The weather strip 28 has an interior hold portion 30 being U-shaped that holds a flange 12 of a back panel 10, and an exterior hold portion 32 also being U-shaped that holds a flange 16 of a window frame 14. A tongue sealing portion 34 covering the outside face 13 of the back panel 10 extends from the exterior hold portion 32 to the outside of the outer surrounding portion. The tongue sealing portion 34 has a seal-lip 36, which seals and holds a window frame 14 to prevent it from sinking, at a side of the outside face 13 of the back panel 10. The window frame 14 includes a flange 16 and a frame 18 that has two lines of channels 20 and 22. A U-shaped glass run 46 for a sliding glass 62 is provided at an inner channel 20, and an outer weather strip 48 is provided in the outer channel 22. A window frame rubber for a fixed glass 64 (FIG. 1) is mounted on the outside channel 22 of the fixed glass 64 on both sides of the sliding glass 62. The exterior side wall 24 of the frame 18 extends downward from window frame 14, and a plastic water pipe 26 is installed between the exterior side wall 24 and the flange 16. The water pipe 26 functions as a drain located underneath the edges of the window frame 14.

However, the water pipe 26 needs to be separately prepared which requires both assembly time and labor. Furthermore, a height differential occurs between the weather strip 28 and the exterior side wall 24 of the frame 18, with such a differential detracting from the appearance of the weather strip 28.

SUMMARY OF THE INVENTION

It is an object of the present invention to provide a weather strip for a back window where the water pipe has no need to be separately prepared.

Another object of the present invention is to provide a weather strip for the back window having no height differential between the exterior side wall of the frame body and the weather strip so that it has a good appearance.

To achieve the foregoing objects, the weather strip has an U-shaped interior hold portion that holds a flange of the back panel, and an U-shaped exterior hold portion that holds a flange of window frame.

An elongated tongue sealing portion covering the outside face of the back panel extends from the exterior hold portion at the outer surrounding side. The tongue sealing portion has at least a seal lip on the opposite side thereof that presses the outside of the back panel.

A blind lip, in which a tip portion is substantially in the same height level with the outside wall of the window frame, projects from the outside of the inner surrounding portion. A drain hole that runs from the base portion of the blind lip to the backside of the tongue sealing portion is provided.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENTS

Figure 1:
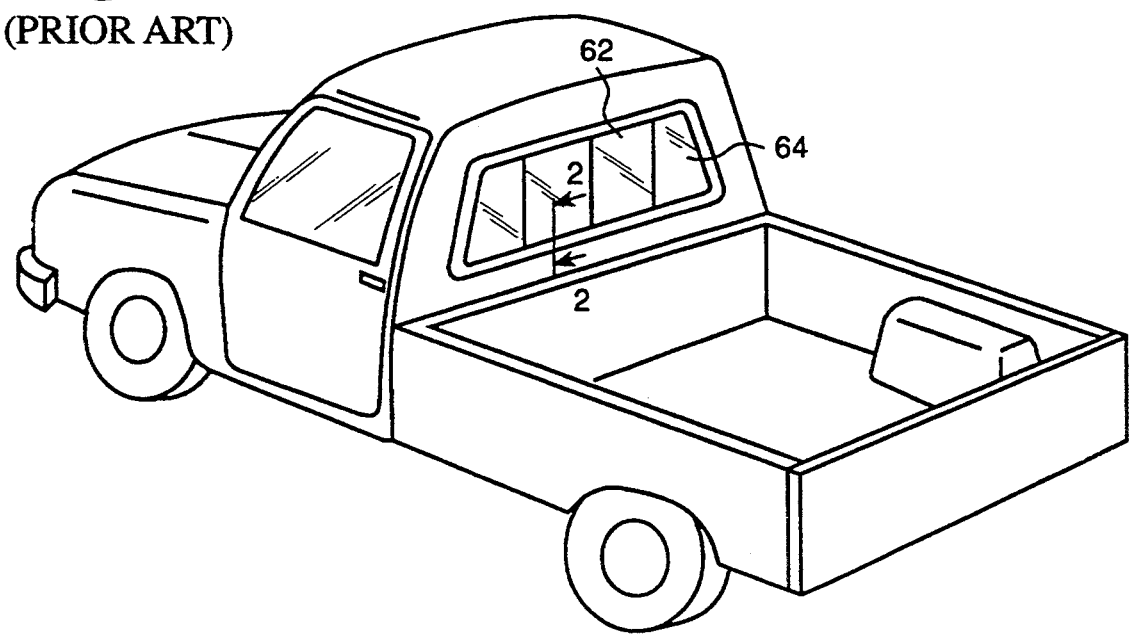
FIG. 1 is a backside perspective view of a truck having a sliding window that is applied to the related art and the present invention.
Figure 2:
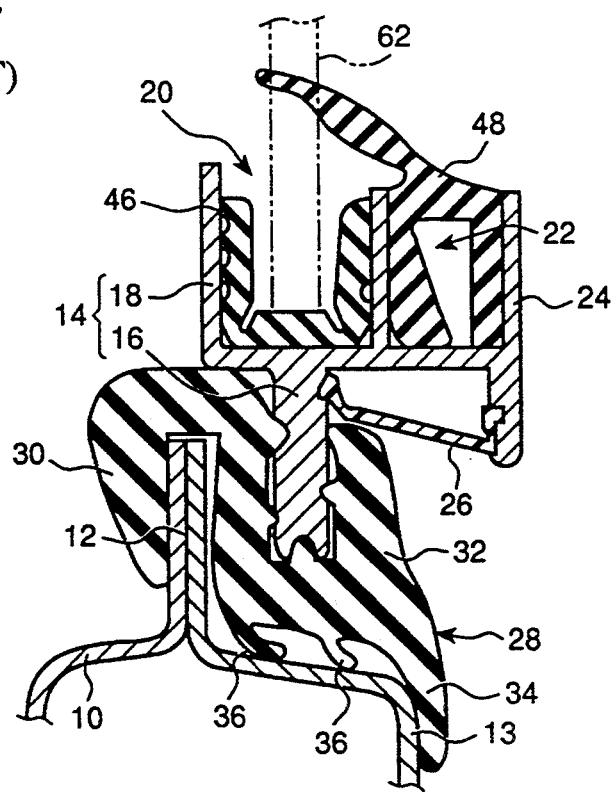
FIG. 2 is a cross-sectional view of a fixed weather strip for a back window of the related art (Line 2—2 FIG. 1).
Figure 3:
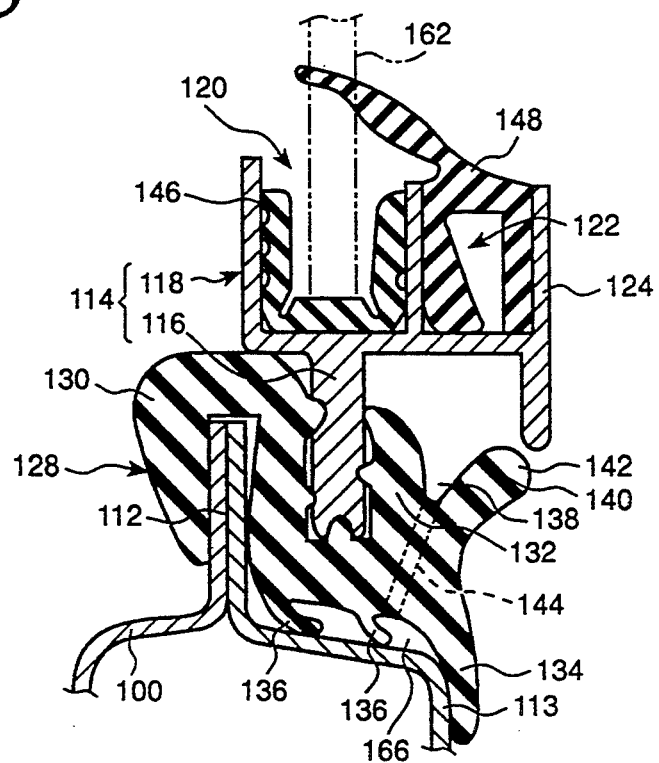
FIG. 3 is a cross-sectional view of a fixed weather strip for a back window according to the first embodiment of the present invention (Line 2—2 FIG. 1).

FIG. 3 illustrates a first embodiment of the present invention, which will be described in detail hereinafter.

A weather strip 128 has an U-shaped interior hold portion 130 that holds a flange 112 of the back panel 100, and an U-shaped exterior hold portion 132 that holds a flange 116 of a window frame 114. A tongue sealing portion 134 covering the outside face of the back panel 100 extends from the exterior hold portion 132 of the outer surrounding side. The tongue sealing portion 134 has two seal lips 136 on a surface thereof that press against the outside face 113 of the back panel 100.

A blind lip 140, in which a tip portion 142 is substantially at the same height level with the exterior side wall 124 of the window frame 114, projects from the outside of the inner surrounding portion so that the height differential between the exterior side wall 124 of the frame 118 and the weather strip is not so conspicuous.

By providing the blind lip 140, a water pipe portion 138 is formed below the bottom portion of the frame 118. Water, which drops into the water pipe portion 138, is drained through a drain hole 144 to the outside of the car and then through a drain passageway 166 that is provided at the backside of the tongue sealing portion 134. Therefore, there is no need to prepare separately a water pipe 26 as in the related art, and fix the pipe to the frame 118. The drain hole 144, that runs from the base of the blind lip 140 to the backside of the tongue sealing portion 134, is provided instead. The drain hole 144 may also be provided at about the middle portion. The blind lip 140 is provided so that the gap appears with the consideration of fitting dispersion (generally from +0.5 mm to 2 mm).

The window frame 114 is fixed to the car body in the following steps.

The weather strip 128 is fixed to the outer surrounding flange 116 of the assembly including the sliding glass 162 and the fixed glass 164. The assembled weather strip 128 is fixed to the flange 112 of the back panel 100 by expanding the groove portion with fitting string that can be inserted in the groove of the interior hold portion 130.

The weather strip 128 is made of ethylene propylene rubber or chloroprene rubber that has a high resistance to weathering.

Figure 4:
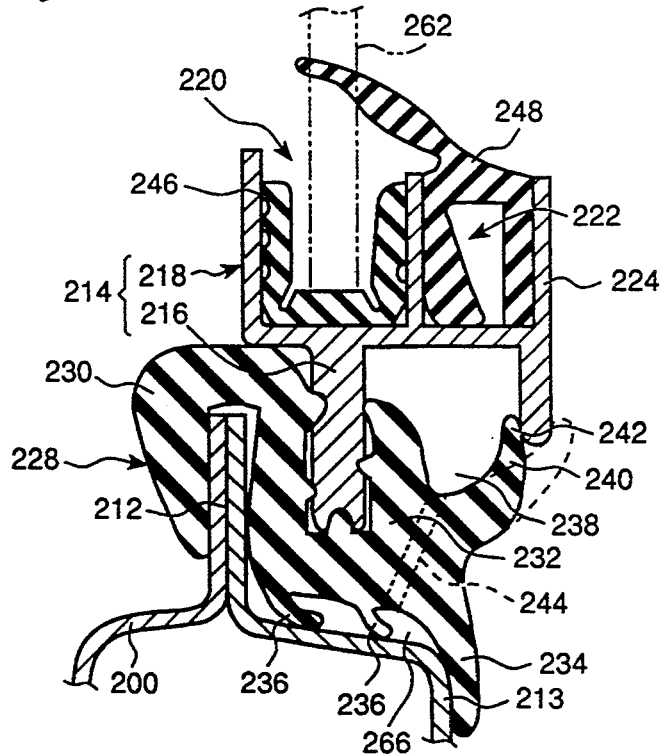
FIG. 4 is a cross-sectional view of a fixed weather strip for a back window according to the second embodiment of the present invention.

FIG. 4 illustrates a second embodiment of the present invention, which will be described in detail hereinafter.

A weather strip 228 has an U-shaped interior hold portion 230 that holds a flange 212 of the back panel 200 and has an opening at outer surrounding side, and an U-shaped exterior hold portion 232 that holds a flange 216 of a window flame 214 and has an opening at an inner surrounding side. A tongue sealing portion 234 covering the outside face of the back panel 200 extends from the exterior hold portion 232 at an outer surrounding side thereof. The tongue sealing portion 232 has at least a seal-lip 236 on the opposite face of the outside of the back panel 200.

A blind lip 240 having a tip portion 242 is substantially at the same height level with the exterior side wall 224 of the window frame 214. The blind lip 240 projects from the outside of the inner surrounding portion so that the height differential between the exterior side wall 224 of the frame 218 is not so conspicuous.

By providing the blind lip 240, a water pipe portion 238 is formed below the bottom portion of the frame 218. Water, which drops into the water pipe portion 238, drains through a drain hole 244 to the outside of the car and then through a drain passageway 266 that is provided at the backside of the tongue sealing portion 234. Therefore, there is no need to prepare separately a water pipe 26 as in the related art and fix the water pipe to the frame 218. A drain hole 244 that runs from the base portion of the blind lip 240 to the backside of the tongue sealing portion 234 is provided instead. This drain hole 244 may also be provided at about the middle portion.

A tip 242 of blind lip 240 elastically contacts the lower edge backside or frontside of the exterior side wall 224 of the frame 218. The blind lip 240 is provided so that the no gap appears (generally, the lip overlaps the side wall 224 from 0.5 mm to 3 mm). Consequently, a good appearance may be obtained.

The window frame 214 is fixed to the car body in the following steps.

The weather strip 228 is fixed to the outer surrounding flange 216 of the assembly that includes the sliding glass 262 and the fixed glass 264. The assembled weather strip 228 is fixed to the flange 212 of the back panel 200 by expanding the groove portion with fitting string that can be inserted in the groove of the interior hold portion 230.

The weather strip 228 is made of ethylene propylene rubber or chloroprene rubber that has a high resistance to weathering.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A weather strip for a window of a vehicle that includes a sliding glass, a fixed glass and a window frame, comprising:
   a substantially U-shaped interior side wall including a groove formed therein for connecting said weather strip to a flange of a back panel of said vehicle;
   a substantially U-shaped exterior side wall including a groove formed therein for connecting said weather strip to a flange of said window frame;
   a tongue sealing portion extending downwardly from said U-shaped exterior side wall, said tongue sealing portion covering an outside face of said back panel;
   a blind lip portion extending outwardly and upwardly from said U-shaped exterior side wall towards said window frame; and
   a drain formed between said blind lip and said U-shaped exterior side wall for channeling water dripping from said window frame towards an exterior of said vehicle.

2. A weather strip as claimed in claim 1, wherein said blind lip extends so as to overlap said window frame.

3. A weather strip as claimed in claim 1, wherein said drain is formed substantially at a base of said blind lip.

4. A weather strip as claimed in claim 1, further comprising at least one seal lip disposed between said exterior side wall and said back panel of said vehicle;
   wherein, said drain is connected to a channel formed between said tongue sealing portion, said back panel of said vehicle, and said seal lip.

5. A weather strip as claimed in claim 1, wherein a tip of said lip portion is at substantially the same height level as a lower end of said window frame.

6. A weather strip for a window of a vehicle that includes a sliding glass, a fixed glass and a window frame, comprising:
   a substantially U-shaped interior side wall including a groove formed therein for connecting said weather strip to a flange of a back panel of said vehicle;
   a substantially U-shaped exterior side wall including a groove formed therein for connecting said weather strip to a flange of said window frame;
   a tongue sealing portion extending from said U-shaped exterior side wall, said tongue sealing portion covering an outside face of said back panel;
   a blind lip portion extending from said U-shaped exterior side wall towards said window frame so that said blind lip is overlapped by said window frame; and
   a drain formed inwardly of said blind lip for channeling water dripping from said window frame towards an exterior of said vehicle.

* * * * *